G. L. MILLER.
ROLLER BEARING.
APPLICATION FILED JAN. 25, 1918.

1,282,450.

Patented Oct. 22, 1918.

INVENTOR
George L. Miller,
J. W. Bond
ATTORNEY.

UNITED STATES PATENT OFFICE.

GEORGE LEE MILLER, OF CANTON, OHIO, ASSIGNOR TO THE GILLIAM MANUFACTURING COMPANY, OF CANTON, OHIO, A CORPORATION OF OHIO.

ROLLER-BEARING.

1,282,450.

Specification of Letters Patent.

Patented Oct. 22, 1918.

Application filed January 25, 1918. Serial No. 213,666.

*To all whom it may concern:*

Be it known that I, GEORGE LEE MILLER, a citizen of the United States, residing at Canton, in the county of Stark and State of Ohio, have invented a new and useful Roller-Bearing, of which the following is a specification.

My invention relates to improvements in roller bearings and the objects of the invention are, to generally improve bearings of the character indicated, to provide a roller bearing which may not only be conveniently assembled, but may also be readily taken apart for replacement of rollers and the like; which will be simple to manufacture, efficient and satisfactory in operation, adapted to continuously maintain a condition of proper lubrication and thus extend the life of the bearing by decreasing friction to the minimum.

These objects, together with other objects apparent to those skilled in the art, may be attained by the construction illustrated in the accompanying drawings, although the invention may be embodied in other forms, the construction illustrated being chosen by way of example.

In the drawings.

Throughout the several views similar reference numerals indicate similar parts.

Figure 1:
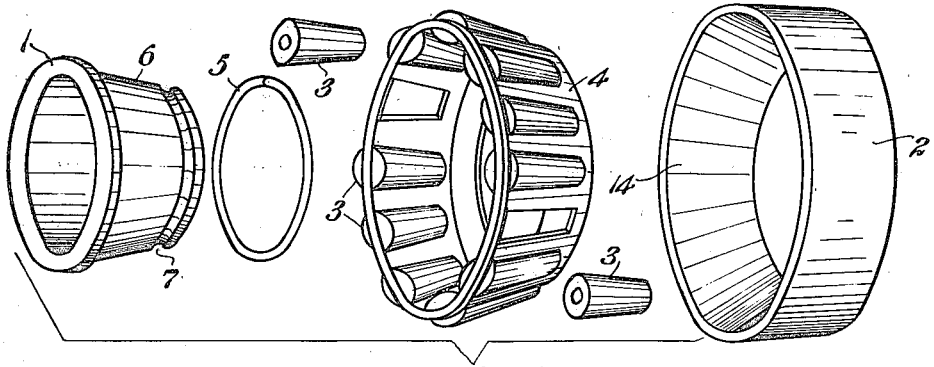
Figure 1 is a perspective view of a complete bearing embodying my invention, the parts being separated to more fully disclose the construction.
Figure 2:
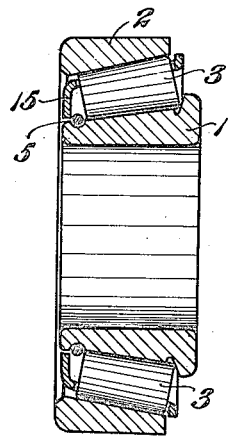
Fig. 2 is a vertical axial sectional view through an assembled bearing embodying the invention.
Figure 3:
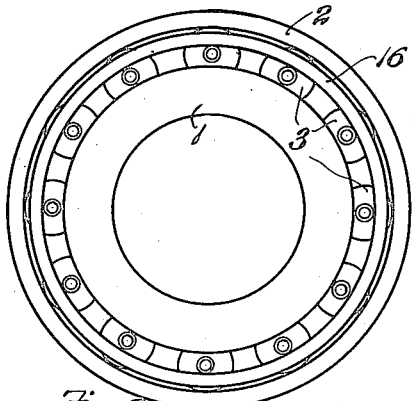
Fig. 3 is an end elevation of the same.
Figure 4:
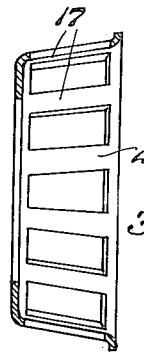
Fig. 4 is a vertical, axial sectional view through the roller cage.
Figure 5:
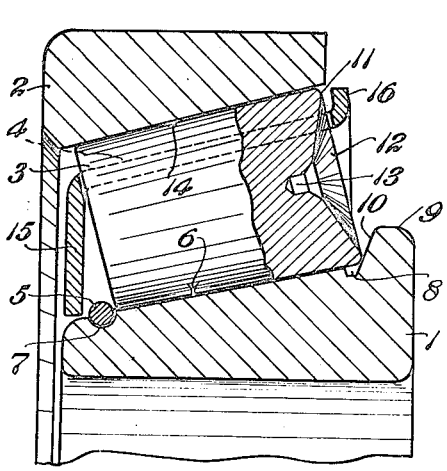
Fig. 5 is an enlarged, fragmentary, vertical, axial, sectional view showing parts of the assembled bearing in their relative positions, and a portion of the roller being broken away to more fully disclose its construction.

More specifically describing the construction disclosed in the drawings, the numeral 1 indicates the cone and the numeral 2 the cup of the bearing, which cup and cone are intended for relative rotation while a plurality of rollers 3, retained by the cage 4 bear on the cone 1 and cup 2. The ring 5 retains the various parts mentioned in operative position as hereinafter more fully described.

The cone 1 is provided with the conical outer bearing surface 6 which extends from the annular ring-groove 7 at the smaller end to the annular lubricating groove 8 at the larger end. At the outer edge of said groove 8 the cone 1 is provided with the integral thrust-flange 9 which is provided with the annular roller-engaging surface 10 disposed at an obtuse angle with reference to the surface 6, the said surface 10 being in continuation of the outer wall of the groove 8.

Each of the rollers 3 is frusto-conical in shape, provided at its base with the rounded edge 11, concave end depression 12, and axial recess 13. The rollers should be of appropriate length to extend substantially from the surface 10 to the ring groove 7 when said rollers bear upon the surface 6, with sufficient allowance however for freedom of action as will be well understood by those skilled in the art.

The cup 2 is provided with the inner conical bearing surface 14 which is so disposed as to engage the rollers 3 when arranged upon the cone 1.

The cage 4 is preferably formed from sheet metal and comprises the integral, inwardly extending, annular flange 15 at the smaller end, the integral outwardly extending, annular flange 16 at the larger end and an integral intermediate frusto-conical skeleton portion formed of the roller separating ribs 17.

The retaining ring 5 is preferably made of spring wire in the form of a split ring adapted to be freely and removably seated in the ring groove 7 of the cone.

It will be noted that the flange 15 extends to a point closely adjacent the outer surface of the cone 1 and that it is adapted to engage the retaining ring 5 when the cage 4 is moved toward the larger end of the cone 1. The importance of this construction will be readily apparent when it is understood that in the assembling of the bearing the rollers with the cage, and ring 5 must be moved onto the cone 1 from the smaller end. The flange 15, engaging the ring 5 forces it into the groove 7 where it retains the cone in place with reference to the rollers 3 by engaging the edges of said rollers at their smaller ends, when there is any tendency of said rollers to move toward the smaller end. After the bearing is assembled and the ring 5 seated in the groove 7 the flange 15 tends to retain the ring 5 within said groove, the cage being held in place by engagement with the rollers 3. To disassemble the bearing it is only necessary to spring the ring 5 out of the groove 7, whereupon the cone 1 may be easily removed as will be readily understood.

Attention should also be called to the fact that the flange 15 aids in retaining lubricant at the smaller end of the bearing while the flange 16, extending outwardly and to a point closely adjacent the bearing surface 14 of the cup serves to return the lubricant, which is naturally drawn to the larger end of the bearing, to the bearing surface.

The lubricating groove 8 in the cone 1 insures retention of sufficient lubricant where the rounded edges 11 of the rollers engage the surface 10 of the thrust flange. Said edges 11 being rounded give a single point contact for each roller against the thrust flange, and this feature together with the certainty of lubrication just described is adapted to reduce friction to the minimum.

As the lubricant works toward the larger ends of the rollers and is returned by the flange 16 as hereinbefore described, it not only is again forced into engagement with the bearing surface of the cup but is also stored in the depressions 12 and recess 13 of the various rollers in such way as to be carried to and from the groove 8 and surface 10 and thus be distributed where most needed. In the distribution of lubricant it should also be noted that the rotation of the rollers has a tendency to cause the lubricant in the depression 12 and recess 13 to be thrown outwardly toward the edge 11 of each roller.

Figure 6:
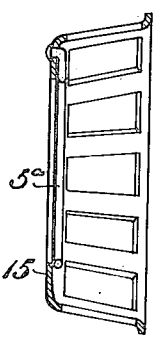
Figs. 6 and 7 are, respectively, a vertical axial sectional view and an end elevation of a modified form of cage.
Figure 7:
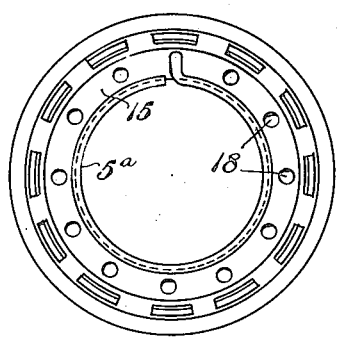

In the modified form of cage illustrated in Figs. 6 and 7 it will be noted that the split retaining ring 5ª has one of its ends extended through and riveted to the flange 15. It is obvious that by so connecting the retaining ring to the cage the loose parts of the bearing when disassembled will be reduced in number and the operation of assembling and disassembling will be simplified in some cases where this result is desired.

In the flange 15 of the modified form of cage may be placed, if desired, apertures 18 which I have shown as substantially axially located with reference to the rollers. In some uses of the bearing these apertures may be desired to permit the lubricant to work through the flange 15.

Although the drawings and above specification disclose the best mode in which I have contemplated embodying my invention, I desire to be not limited to the details of such disclosure, for the invention itself is broader than would be apparent from such details and many changes in form and construction may be made as circumstances require or experience suggests, while yet embodying the essential features of the invention, within the scope of the appended claims.

Having fully described my invention what I claim as new and desire to secure by Letters Patent, is:

1. A roller bearing comprising an inner cone, a frusto-conical cage of relatively larger diameter than said cone, a plurality of openings formed in said cage, a plurality of rollers of relatively larger diameter than said openings upon said cone, an inwardly turned annular flange upon the smaller end of said frusto-conical cage, an annular groove formed adjacent the smaller end of said cone and a split ring adapted to be pushed into said groove by said inwardly extending flange and to fit within said groove and about said cone.

2. A roller bearing comprising an inner cone, a plurality of rollers upon said cone, a frusto-conical cage spaced from said cone, a plurality of openings in said cage equal in number to said rollers, said rollers being adapted to extend partially through said openings, a concentric conical depression formed in the end of each roller at the end adjacent the larger end of said cone and an outwardly extending flange upon said cage at its larger end, the said flange being adapted to prevent lubricant forced centrifugally toward the larger end of said cage from escaping when said bearing is rotated.

3. A roller bearing comprising an inner cone, an annular flange formed upon the larger end of said cone, an annular groove formed adjacent said flange, a plurality of rollers adapted to lie upon said cone and to engage said flange, a frusto-conical cage spaced from said cone and adapted to hold said rollers, an outwardly extending flange upon the larger end of said cage, said flange being adapted to collect lubricant forced centrifugally toward the larger end of said cage, a concentric conical depression formed in each of said rollers at the end adjacent the larger end of said cone, the said conical depressions being adapted to wipe the said lubricant from the annular flange upon the cage and to deposit said lubricant within the annular groove upon said cone as the said bearing is rotated.

4. A roller bearing comprising an inner cone, an annular groove formed adjacent the smaller end of said cone, a frusto-conical cage encircling said cone and spaced there-from, a plurality of rollers upon said cone, a split ring carried by said cage and adapted to fit within the said annular groove within the said cone and to rotate therein as the said bearing is rotated.

5. In a roller bearing, a cone provided at its smaller end with a ring-groove, a series of rollers on said cone, a split ring adapted to be forced over the smaller end of said cone, to be seated in said ring-groove and to retain said rollers upon said cone, and a roller cage engaging said rollers and provided with an integral flange adapted to engage said ring to slip it over the smaller end of said cone into said groove.

6. For a roller bearing of the character described, a roller provided with a centrally recessed end adapted to retain and distribute lubricant.

7. For a roller bearing of the character described, a roller provided with a conical recessed end, said recess extending substantially to the outer bearing surface of the roller and adapted to collect, retain and distribute lubricant.

8. In a roller bearing of the character described, a frusto-conical roller cage provided at its smaller end with an inwardly disposed lubricant controlling flange having a series of apertures arranged thereon.

9. In a roller bearing of the character described, a roller cage provided with an inwardly extending flange and a sliding ring having a greater external diameter than the internal diameter of said flange, lying adjacent one side of said flange and having one of its ends attached thereto.

10. For a roller bearing of the character described, a roller provided with a centrally recessed end adapted to retain and distribute lubricant, said roller provided with a rounded edge.

In testimony that I claim the above, I have hereunto subscribed my name.

GEORGE LEE MILLER.